United States Patent [19]

Grubka et al.

[11] Patent Number: 4,488,891
[45] Date of Patent: Dec. 18, 1984

[54] METHOD FOR FORMING GLASS FIBERS

[75] Inventors: Lawrence J. Grubka, Heath; Clarence E. Fracker, Jr., Frazeysburg, both of Ohio

[73] Assignee: Owens-Corning Fiberglas Corporation, Toledo, Ohio

[21] Appl. No.: 481,936

[22] Filed: Apr. 11, 1983

[51] Int. Cl.³ .......................................... C03B 37/085
[52] U.S. Cl. ................................................ 65/2; 65/1; 264/179; 425/72 S
[58] Field of Search ............... 65/1, 2, 12; 425/72 R, 425/72 S; 264/179

[56] References Cited

U.S. PATENT DOCUMENTS

| | | |
|---|---|---|
| Re. 21,863 | 7/1941 | Slayter . |
| 2,189,822 | 2/1940 | Thomas et al. . |
| 2,212,528 | 8/1940 | Slayter . |
| 2,257,767 | 10/1941 | Slayter et al. . |
| 2,577,213 | 12/1951 | Slayter et al. . |
| 2,947,027 | 8/1960 | Slayter . |
| 2,947,028 | 8/1960 | Slayter . |
| 3,187,076 | 6/1965 | Machlan et al. . |
| 3,328,144 | 6/1967 | Glaser .................. 65/11 |
| 3,390,972 | 7/1968 | Froberg ................ 65/1 |
| 3,401,536 | 9/1968 | Glaser .................. 65/1 |
| 3,416,906 | 12/1968 | Glaser .................. 65/1 |
| 3,492,104 | 1/1970 | Glaser .................. 65/11 |
| 3,556,753 | 1/1971 | Glaser .................. 65/2 |
| 3,840,358 | 10/1974 | Whitfield ............... 65/1 |
| 3,920,429 | 11/1975 | Stalego ................. 65/1 |
| 3,926,600 | 12/1975 | Stalego ................. 65/1 |
| 3,988,135 | 10/1976 | Coggin ................. 65/1 |
| 4,026,689 | 5/1977 | Higginbotham .......... 65/1 |
| 4,046,535 | 9/1977 | Stalego ................. 65/1 |
| 4,161,396 | 7/1979 | Greene ................. 65/1 |
| 4,167,403 | 9/1979 | Coggin ................. 65/1 |

Primary Examiner—Robert Lindsay
Attorney, Agent, or Firm—Ronald C. Hudgens; Greg Dziegielewski; Hiram P. Settle

[57] ABSTRACT

A glass fiber attenuation apparatus and process wherein molten glass is supplied from a molten glass body to an orifice plate at substantially atmospheric pressure to prevent molten glass flow through an orifice at which attenuation has ceased, thus permitting continuation of the attenuation process despite breakouts at individual orifices. The preferred embodiment of the method includes the steps of cooling the orifice plate undersurface to a non-wetting temperature and delivering molten glass to the orifice plate at a pressure less than the internal, surface tension-generated pressure of any bead formed on the undersurface of the orifice plate upon attenuation cessation at that orifice. The preferred embodiment of the apparatus includes a perforate pressure plate immersed in the body of molten glass and superimposed over the orifice plate to effect a pressure drop upon normal attenuation flow which is sufficient to reduce the pressure immediately above the orifice plate to substantially atmospheric pressure or, in any event, to a pressure less than the internal pressure of a bead or globule formed on attenuation cessation at an orifice. The orifice plate may be of either the planar, non-tipped type or of the tipped type, and the orifice plate may be cooled to the appropriate temperature either by gas flow cooling directed at the undersurface of the orifice plate or by fin shields.

22 Claims, 24 Drawing Figures

METHOD FOR FORMING GLASS FIBERS

FIELD OF THE INVENTION

The invention is an improvement in the production of filaments from molten material and particularly from siliceous material such as glass; it minimizes process interruptions from flooding and bead drops.

BACKGROUND OF THE INVENTION

In producing continuous glass filaments, it is conventional to flow individual streams of molten glass from closely spaced orifices in the bottom wall of an electrically heated platinum alloy feeder or bushing. Apparatus associated with the feeder draws or attenuates the streams into filaments which may be either continuous or discontinuous.

There are two types of continuous filament feeders in general use: a first, conventional, more widely used type employs a bottom wall having stream emitting orifices provided at orificed projections or tips jutting from its exterior surface; a second, more recently developed, type uses an orificed bottom wall having a planar exterior surface. The first former type is known as a "tipped" feeder, and examples are disclosed in Russell Pat. No. Re. 24,060 and in Glaser et al Pat. Nos. 4,222,757 and 4,321,074. The second type is known as a "tipless" feeder, and an example of such a feeder or bushing is disclosed in Strickland Pat. No. 3,905,790.

A third type of continuous filament feeder utilizes enlarged depending "tips", each provided with multiple orifices which are "tipless". Thus, this feeder is a hybrid "tipped-tipless" feeder.

Heretofore, tipless type feeders flooded at start-up and during filament formation upon a filament break. Flooding makes feeder start-up slow and interrupts filament formation once the filament attenuation operation is begun. In contrast, tipped type feeders are not as prone to flooding. The orificed projections of tipped type feeders isolate at their end regions the individual emitted molten glass streams, and thus impede the movement of the molten glass to flood the exterior surface of the bottom wall. Tipless feeders do not incorporate this stream isolating geometry.

These various types of feeders have been harried by glass beads dropping into the "veil" of filaments during filament attenuation. When a filament breaks during filament attenuation, molten glass oozes from the orifice associated with the broken filament; the molten glass forms a small glob or bead that enlarges until its mass causes it to fall away from the orifice into the filaments being attenuated. Like flooding, bead drops interrupt filament production. Even a single bead drop entering the veil causes additional fibers to break, and the resultant forming interruption occurs successively until the entire feeder must be restarted.

SUMMARY OF THE INVENTION

This invention proposes an improvement in glass fiber forming or attenuation apparatus and processes. A preferred, specifically disclosed embodiment of the invention involves a filament forming system of any of the above described types wherein a body of molten glass, retained in a bushing, is supplied to an orifice plate forming the bushing bottom and streams of the molten glass issue from the orifices of the orifice plate for attenuation to filaments from fiber forming cones at the orifice plate lower exterior surface.

The invention process, during filament attenuation, reduces the pressure of the molten glass above the orifice plate to a pressure less than the internal pressure of a globule or bead formed upon attenuation cessation, but greater than the internal pressure of the forming cones during attenuation, and further maintains the undersurface of the orifice plate and the forming cones at a temperature at which the molten glass will not flood across the undersurface of the orifice plate. The pressure of molten glass above the orifice plate is insufficient to overcome the interior pressure of a molten glass bead or globule formed upon interruption of filament attenuation at any given orifice, and the bead or globule will not enlarge and drop because no glass can be fed to it through the orifice from the overlying lower pressure molten glass body. Further, the temperature of the orifice plate and the molten glass of the bead or globule is sufficiently low that the bead or globule will not spread across the plate or flood. As a result, the bead or globule formed on interruption of filament forming will not interfere with the continued attenuation of filaments at the other orifices of the orifice plate. The bead or globule will either remain in position or actually move upwardly into the overlying orifice against the lesser pressure of the molten glass above the orifice plate.

The hereinafter specifically disclosed apparatus of this invention includes a perforate pressure plate positioned in the body of molten glass above the orifice plate and operative during steady state operation to impose a sufficient pressure drop in the molten glass body to reduce the pressure above the orifice plate to substantially atmospheric pressure. Means are provided to maintain and control the temperature of the molten glass body and of the orifice plate so that proper fiber forming temperatures in the molten glass are maintained, and the orifice plate is cooled to the proper non-wetting temperature for the combination of specific glass composition and specific orifice plate alloy. Preferably, the pressure plate and the orifice plate are electrically heated in parallel to different temperatures, although a heating means independent of the pressure plate can be provided. The orifice plate is cooled by exterior cooling means, e.g., a flow of cooling gas or fin shields, to the desired non-wetting temperature.

During start-up, the pressure drop across the pressure plate is substantially less than the pressure drop during normal attenuation operation, since there is a lower flow of molten glass through the pressure plate perforations. Thus, the bushing will "bead down" for start-up.

In other embodiments of the invention, the physical arrangements can vary substantially. The invention can be utilized in continuous or discontinuous fiber processes, the fibers can be attenuated mechanically or by gaseous means, and the glass compositions and fiber diameters can be widely varied. The molten glass need only be supplied to the orifices of the orifice plate at a pressure which (a) is less than the internal pressure of a bead formed upon attenuation interruption and (b) is greater than the internal pressure of the forming cones during steady state attenuation. The pressure plate is one example by which this can be accomplished, and the pressure plate may be replaced by any suitable means for imposing a pressure drop in the supply of molten glass which is (a) proportional to the rate of molten glass flow, and (b) effective to reduce the pressure above the orifice plate to a pressure (1) less than the internal pressure of the bead formed at a given orifice upon breakout at that orifice when the remainder of the orifices operate normally, and (2) greater than the internal pressure of the cones during steady state attenuation. Such pressure drop imposing means as single or multiple flow restrictions, a thermal valve, etc., may be used, so long as the start-up condition of sufficient pressure to permit bead growth is maintained. Further, a conventional tipped bushing utilizing fin shield cooling can be adapted to provide the dripless feature of the present invention by utilizing only the pressure drop imposing means herein disclosed to reduce the pressure above the tipped orifice plate to desired value.

In order to explain the present invention, it is necessary first to consider the pressure and temperature aspects of the invention and then to disclose a specific, preferred embodiment of the invention in which the pressure and temperature aspects are integrated into an operable bushing design.

Figure 9:
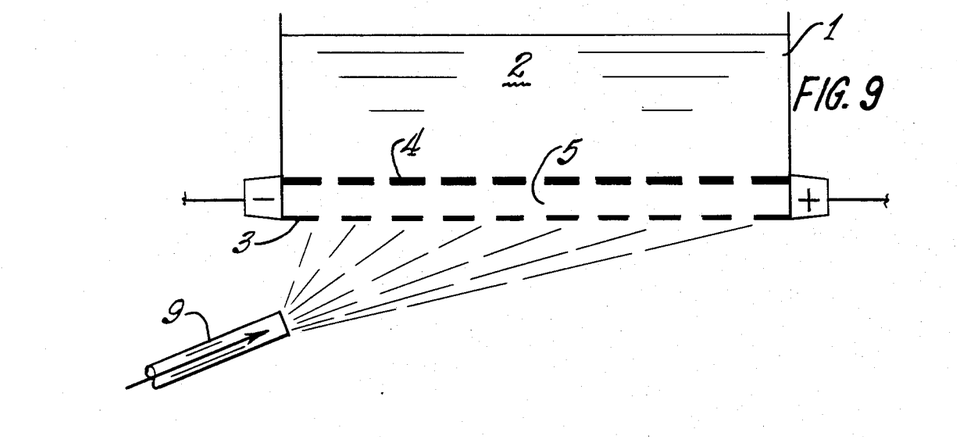
FIG. 9 is a schematic view similar to FIG. 1, but illustrating the thermal heating and cooling of the molten glass and the cooling of the orifice plate utilizing a flow of gas.
Figure 10:
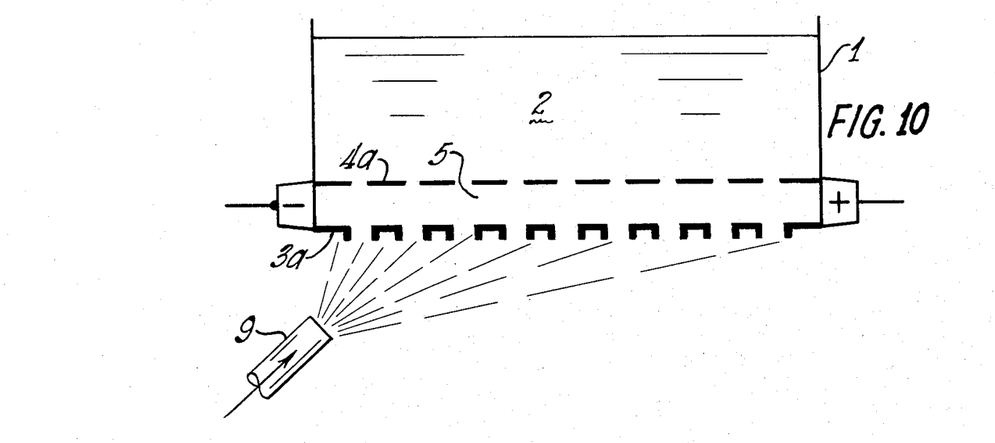
FIG. 10 is a schematic view similar to FIG. 9, but utilizing a tipped bushing.
Figure 11:
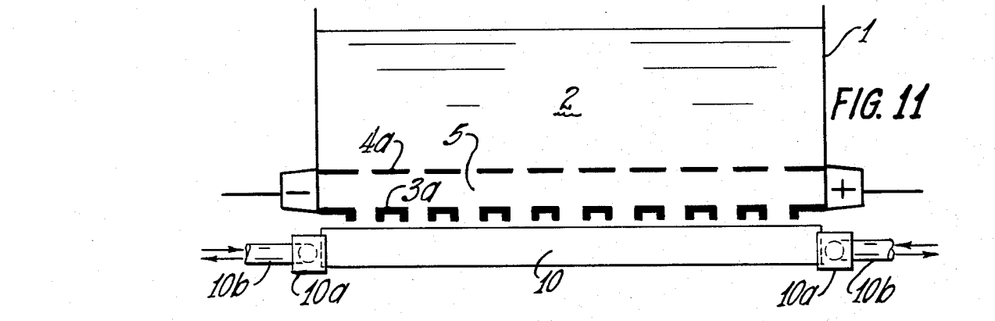
FIG. 11 is a schematic view similar to FIG. 10, but utilizing fin shields to cool the tipped orifice plate.

Accordingly, this disclosure includes FIGS. 1 through 8 in which the pressure relationships are explained and various methods are proposed for maintaining the desired pressures during the successive operating conditions of start-up, steady state operation and interrupted or break-out operation. FIGS. 9 through 11 show various methods of heating and cooling the molten glass to provide for fiberization or attenuation operating temperatures above the orifice plate and non-wetting operating temperatures at the undersurface of the orifice plate. Although the functions of pressure control and thermal control are necessary to provide a workable bushing design, the functions can be physically separated in the bushing itself, as best shown in FIG. 10. Further, the pressure control aspect and methods of this invention can be utilized, if desired, with conventional thermal conditions and methods to provide a workable bushing.

With this background, this disclosure is presented in separate sections as follows.

THE PRESSURE RELATIONSHIPS

In the schematic drawings of FIGS. 1 through 8, the pressure effects of the present invention are illustrated in simplified form.

Figures 1, 2:
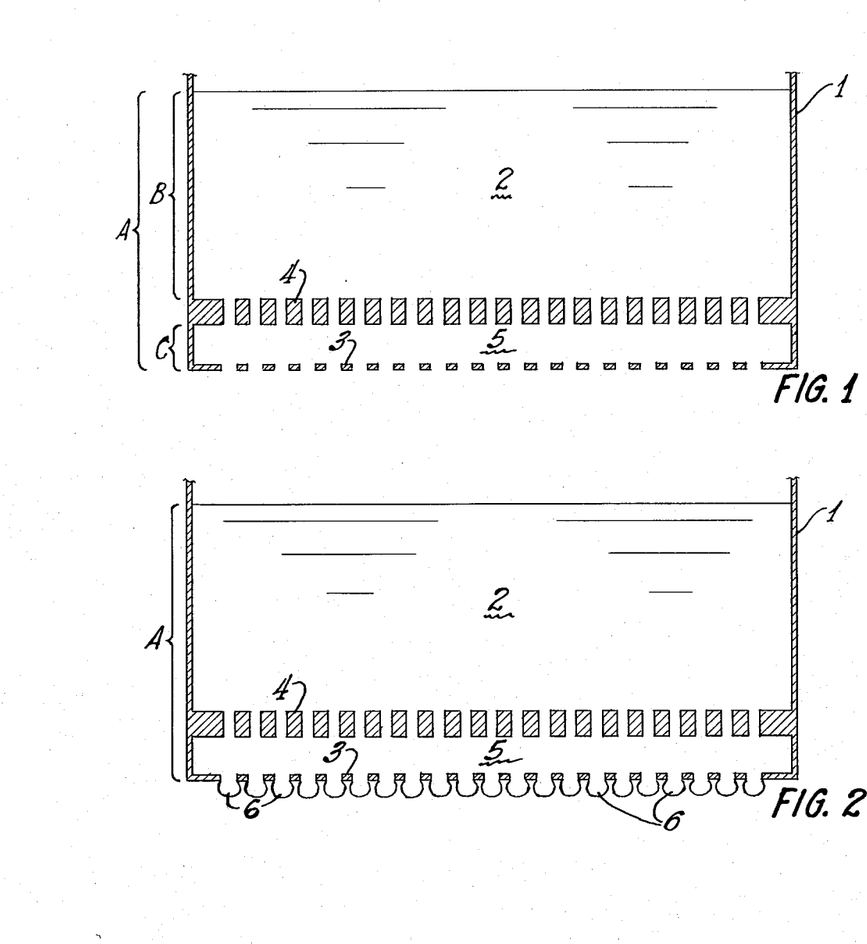
FIG. 1 is a schematic representation of a glass fiber attenuation apparatus of the present invention capable of carrying out the process of the present invention, but with the apparatus heating means deleted for clarity of illustration, and FIG. 1A charts the pressure of molten glass at the indicated location.
FIGS. 2 and 2A are representations similar to FIGS. 1 and 1A, illustrating low rate, start-up flow through the apparatus.

As can be seen from FIG. 1, reference numeral 1 refers to a bushing containing a pool 2 of molten glass preferably at atmospheric pressure overlying a bottom orifice plate 3. An intermediate or pressure perforate plate 4 overlies the planar orifice plate 3 to be coextensive with and parallel to the orifice plate 3. The space between the pressure plate 4 and the orifice plate 3 is indicated by reference number 5.

The total depth of the pool 2 of molten glass overlying the orifice plate 3 is indicated by the reference character A, the depth of glass over the intermediate plate 4 is indicated by the reference character B and the depth of the pool of molten glass filling the space 5 is indicated by reference character C. The effective depth of the pool 2 can be increased, if desired, by pressurizing the bushing, increasing the glass depth, etc.

Typically, in an exemplary commercial operation, the total glass depth A may be about 20.3–25.4 cm, the depth B of glass over the plate 4 may be about 16.5 to 24.8 cm, and the dimension C is about 0.64 to 3.8 cm. Since the plates 3 and 4 serve different functions (the plate 4 to give the desired pressure drop and the plate 3 to form the desired fiber), the orifice sizes, spacings and arrangements may vary substantially. Preferably, in that version of the invention shown in FIG. 1, the apertures in the plates 3 and 4 are about the same in size and spacing, these apertures preferably being circular and ranging in size from about 0.381 to about 0.076 cm in diameter and spaced to provide an orifice density ranging upwardly from about 5 orifices per $cm^2$, and preferably about 15 to 47 orifices per $cm^2$. The thickness of the plates can range from about 0.381 to about 0.025 cm, and the plates 3 and 4 can be of the same or different thickness.

Figure 1A:
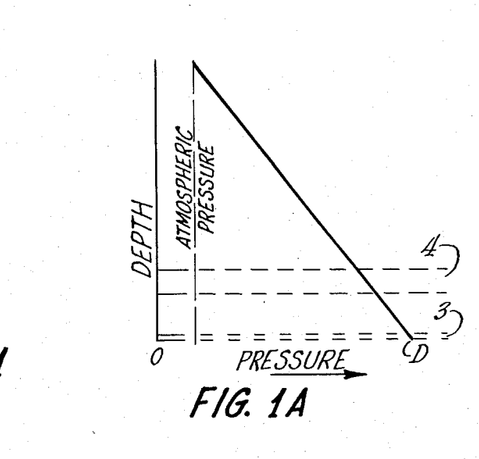

As shown in FIG. 1A, the glass pressure is plotted horizontally and the glass depth is plotted vertically. The values plotted in FIGS. 1A, 2A, 3A and 4A are indicative and qualitative only, not quantitative. Consequently, they are of comparative value, not absolute value. It will be seen that at zero flow rate with the apparatus filled with molten glass at rest, the pressure at the outlet of the orifices of the orifice plate 3 (location D) is equal to the pressure above the glass plus the head pressure of the glass body. As exemplary only, and for the dimensions set forth above where the glass depth is 23.813 cm, the pressure at the location D will be atmospheric pressure plus 23.813 cm of glass.

In operation, the start-up of the bushing is illustrated in FIG. 2 of the drawings. The bushing 1 is filled with molten glass to the level indicated at A, and this pool 2 of molten glass exerts a pressure on the plate 3 which is substantially equal to the total glass head over the plate. There is, at this time, less flow through the orifices of the plate 4 than during steady state attenuation operation, and there is a lesser pressure drop across the plate 4. The glass simply flows slowly through the orifices of the plate 3 to form beads 6 at each orifice on the undersurface of the plate 3 under the head of molten glass. The viscosity of the glass and the wetting angle of the specific glass composition with the specific alloy of the orifice plate 3 at the temperature of the orifice plate are such that the surface tension within the glass forms an individual globule or bead 6 at each orifice, and these beads individually string out from the orifices, as illustrated in FIG. 2, to form a dispersed, separate bead drop at each individual orifice. As the beads drop, they are gathered together into a group and trained about a puller or take-up roll, as is well known in the art, for the attenuation of fibers from the individual orifices. Alternatively, the fibers can be attenuated in a gaseous stream.

Thus, at start-up, the molten glass issues as an individual bead and a separate attenuated stream from each orifice, under the head pressure of the molten body 2 as determined by the total body depth A and the pressure drop across the plate 4. The low flow pressure drop at the plate 4 causes the pressure above the plate 3 to be greater than the internal pressure of a bead formed at the plate 3, and the molten glass beads and drops by extrusion through the orifices of the plate 3.

Figure 2A:
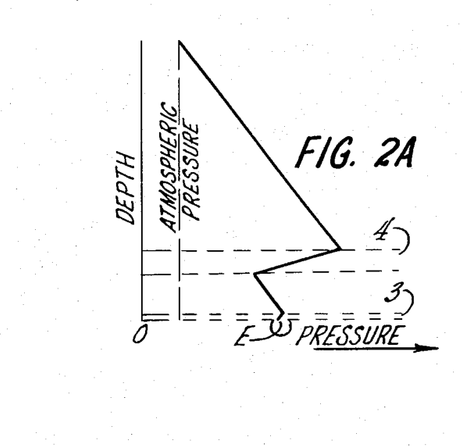

FIG. 2A illustrates the pressure at the point E located at the outlet of the orifices of plate 3 when the apparatus is being operated in its startup mode of FIG. 2. There is minimal downward flow of glass from the molten glass body, with the pressure plate 4 imposing a minimal pressure drop because of the low flow rate and the orifice plate 3 similarly imposes a minimal pressure drop. The pressure—for the example above cited—at the point E will be about atmospheric pressure plus 3.8 cm of glass.

Figure 3:
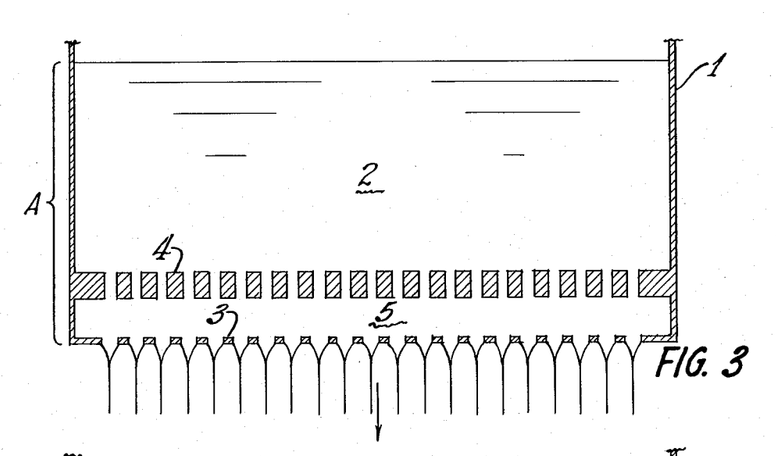
FIGS. 3 and 3A are representations similar to FIGS. 1 and 1A, illustrating steady state, fiberizing flow through the apparatus.

FIG. 3 illustrates schematically the orifice and the effect of the orifice plate and pressure plate combination during steady state fiberizing flow after the bushing has been started in the manner illustrated and discussed in connection with FIG. 2. In FIG. 3, appreciable flow occurs downwardly in the body 2 and through the orifices of the orifice plate as the fibers are drawn at high linear speed and at appreciable output through the orifices. The consequent flow of molten glass through the intermediate plate 4 effects a resultant pressure drop across the intermediate plate. Due to this pressure drop, a reduced pressure results within the space 5 between the intermediate plate 4 and the orifice plate 3.

The pressure drop across the intermediate plate 4 is proportional to the rate of flow through the plate orifices. The plate 4 is specifically designed—in terms of plate thickness, aperture size and aperture density with relation to the flow rate during fiberization—to provide a pressure drop of such magnitude that the pressure at the exit ends of the orifices of plate 3 preferably is substantially atmospheric, and in all instances (a) is less than the internal pressure of a bead of molten glass formed at breakout at an individual orifice of the orifice plate 3 and (b) is greater than the internal cone pressure during steady state attenuation.

Assuming molten E-glass and J alloy in the orifice plate with an orifice of 0.381 cm, the maximum internal pressure of the bead is atmospheric pressure plus about 1.27 cm of glass. With the same assumptions, but with an orifice of 0.076 cm, the maximum internal pressure of the bead is atmospheric pressure plus about 6.4 cm of glass.

Thus, the effect of the intermediate plate 4 is to impose a pressure drop within the body 2 of molten glass such that the pressure immediately above the orifice plate 3 preferably is "substantially atmospheric pressure". The specific pressure at the upper surface of the plate 3 may be greater or less than atmospheric pressure, but it is sufficiently low to stop flow through the orifice when beads form upon breakout. The effect of the intermediate plate in reducing the pressure in the space 5 is independent of the spacing between the plates 3 and 4, so long as the temperature of the plate 3 and of the plate 4 remains substantially constant.

As the glass filaments are attenuated at the orifices of the plate 3 by the conventional pulling mechanism, normal forming cones are generated, these cones having at their upper ends essentially the diameter of the overlying orifice and at their lower ends the diameter of the filament being drawn. Due to the surface tension and the drawing stress exerted on the cones by the attenuation of fibers therefrom, the cones have a reduced internal pressure, which may even be less than atmospheric pressure, at the point indicated by the reference numeral 7. Accordingly, in the preferred embodiment where the glass within the space 5 immediately above the plate is at substantially atmospheric pressure, there is a net vertical driving force forcing glass through the holes in the plate 3 because of the lower internal pressure within each of the cones 7. Of course, the rate of flow through the plate 3 is determined by the characteristics of the plate 3, e.g., the orifice size, the plate thickness, orifice density, etc., the characteristics of the molten glass above the plate 3, e.g., the viscosity of the molten glass, and the differential or net pressure above the plate and within the cone.

Figure 3A:
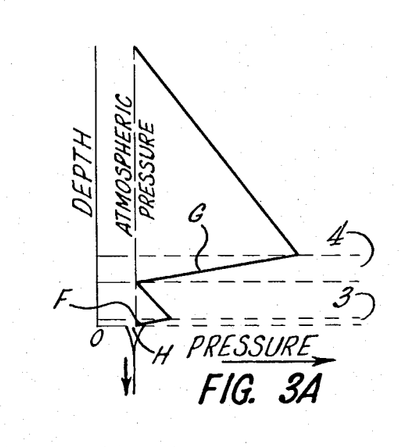

FIG. 3A is a showing of the pressure at the point F located at the outlet of the orifices of the plate 3 as the apparatus is being operated in a steady state attenuation mode with a filament being attenuated at each orifice of the plate 3. Under these conditions, there is an appreciable outflow of glass through the orifices of the plate 3 and the same appreciable flow through the pressure plate 4. Consequently, both the plates 3 and 4 impose a substantial pressure drop in the flow and the pressure drop through the plate 4 is shown schematically by the linear portion G. The magnitude of the pressure drop indicated at G is so great as to reduce the glass body pressure beneath the plate 4 to substantially atmospheric pressure. This pressure increases slightly due to the glass head between the plates 3 and 4 and then decreases again as the molten glass flows through the orifice plate 4. The pressure at point H is less than the pressure immediately above the plate 3. The pressure at the point H (which is actually located interiorly of the forming cone 7) is substantially atmospheric pressure and may be either slightly greater or less than atmospheric pressure, dependent upon such factors as the glass surface tension and the drawing stress, as above explained, and is not determined solely by the pressure drop across the orifice plate 3. In the specific example cited utilizing the exemplary dimensions, the pressure at the point H is about atmospheric pressure less 2.39 cm of glass.

Figure 4:
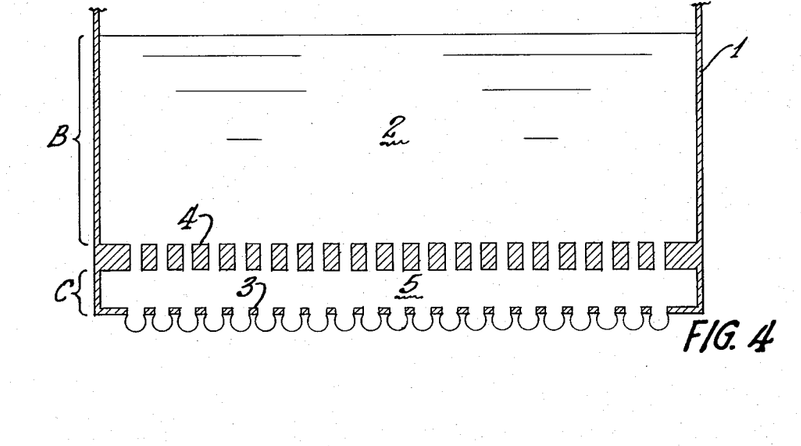
FIGS. 4 and 4A are representations similar to FIGS. 1 and 1A, illustrating interrupted fiber break flow during operation of the apparatus.

Illustrated in FIG. 4 is the condition of bushing 1 of FIGS. 1 through 3 when one or more of the fibers being attenuated is broken or interrupted, so that a fiber is no longer being attenuated and there is no longer any tension stress on the cone 7. At this time, the surface tension of the molten glass forces the cone configuration into a globule or bead 8 which is located at the orifice from which the fiber had been previously drawn. This resultant bead formation is due to the surface tension of the glass at the temperature of the forming operation which attempts to form the cone to a globular body of minimal surface area, and the result of this surface tension, in the absence of attenuation, generates a positive internal pressure within the globule or bead 8, which internal pressure is greater than the pressure of the molten glass above plate 3. The internal pressure within the globule or bead 8 can be determined by utilizing a form of the equation of Young and Laplace which states that the pressure differential acrosss the surface of the globule or bead is proportional to the ratio of the surface tension of the molten glass at that temperature to the mean radius of curvature of the globule or bead. This phenomenon is well known in the art.

The pressure internally of the bead of globule 8 is greater than the pressure above the plate 3, and this internal pressure is sufficient to prevent the passage of additional molten glass at the lesser pressure above the plate 3 through the specific aperture at which the bead is located, so that the bead will not grow and flow along the undersurface of the orifice plate. The pressure within the globule or bead tends to force the molten glass comprising the bead upwardly against the lesser pressure within the space 5 thereabove, and the bead may be forced upwardly into or through the overlying orifices of the orifice plate 3. Whenever interruption of the attenuation process takes place at a specific orifice, the pressure within the globule or bead 8 formed at that orifice will be greater than the internal pressure at the point 7 within the forming cone at the next adjacent orifice. Thus, the interruption of fiber formation at any given orifice of the orifice plate 3 will not interrupt or interfere with the continued fiberization at the adjacent orifices or any other orifices of the orifice plate 3.

Figure 4A:
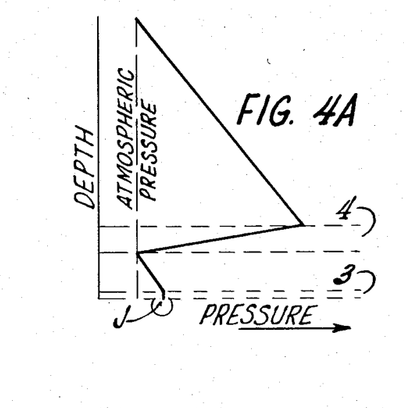

FIG. 4A is a schematic representation of the pressure relationship when the apparatus is in the interrupted attenuation mode of FIG. 4. Here, the pressure at the joint J at the exit of the orifices of plate 3 is substantially atmospheric pressure but greater than the pressure at the point H of FIG. 3A. Where the remainder of the orifices are utilized for attenuation, a filament break or interruption at one orifice will not materially affect the flow rate through the plate 4, as above explained, but the higher internal pressure within the globule or bead 8 of FIG. 4 will prevent any flow through the orifice at which the filament break occurred. As a consequence, there is no pressure drop across the orifice plate 3 at the filament break orifice, and the pressure at that orifice is above atmospheric. Specifically, in the example above cited, the pressure at the point J is about atmospheric pressure plus 1.96 cm of glass.

The operation during fiber interruption shown in FIG. 4 is different and distinct from the operation during start-up flow as shown in FIG. 2. The difference resides in the pressure to which the extruded bead 6 of FIG. 2 is subjected (i.e., essentially the downward extrusion pressure at the head distance A) as contrasted with the subjection of the bead 8 of FIG. 4 (derived from the previous cone) to the lesser pressure immediately above the plate 3 while the interior 8 of the bead is at a higher positive pressure. A comparison of the pressures illustrated in FIGS. 1A and 4A will make these pressure differences evident, and the effect of the pressure drop indicated at G will be appreciated.

Figure 5:
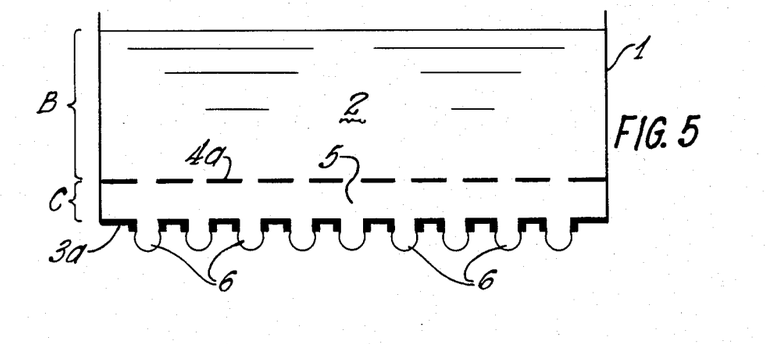
FIG. 5 is a schematic view similar to FIG. 2 but utilizing a different form of tipped orifice plate.
Figure 6:
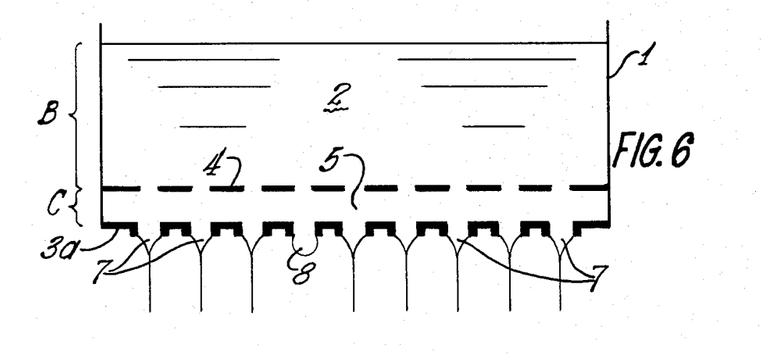
FIG. 6 is a schematic view similar to FIG. 4, but utilizing the tipped orifice plate of FIG. 5.

FIGS. 5 and 6 illustrate the pressure relationships in a tipped bushing having an intermediate plate 4a located above a tipped orifice plate 3a. The configuration of the bushing of FIGS. 5 and 6 is substantially the same as that described in connection with FIGS. 1–4, except that the orifice density may be less due to the presence of the tips on the orifice plate 3a.

The operation of the embodiment of FIGS. 5 and 6 is the same as the embodiment of FIGS. 1–4. The bead down illustrated in FIG. 5 is identical to the bead down of FIG. 2; the beads forming at the orifice tips and stringing down for gathering and attenuation. In steady state operation, a forming cone forms at each tip and fibers are attenuated therefrom under tension.

In the event of fiber interruption at any given orifice, the surface tension of the molten glass converts the cone into a globule or bead having a positive interior pressure, and the bead either remains at the end of the tip or moves upwardly into the tip against the lesser pressure above the orifice plate 3, as shown in FIG. 6. In either event, the globule will not become enlarged, since there can be no downward flow from the space 5 into the globule. In either the embodiment of FIGS. 5 and 6 or the embodiment of FIGS. 1–4, the glass from the space 3 will flow to other orifices and not to the one at which flow has been interrupted.

Figure 7:
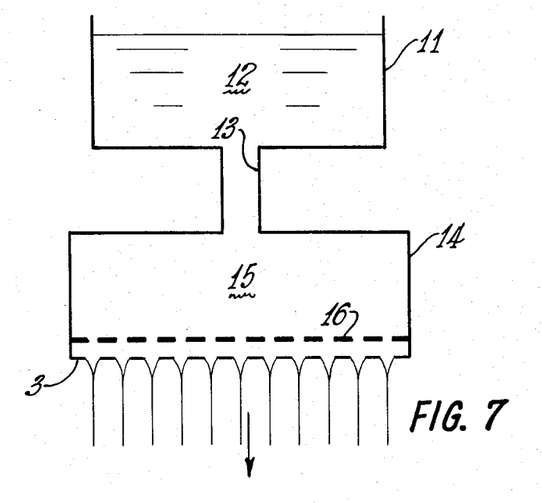
FIG. 7 is a schematic view of a different version of the invention wherein the pressure drop is provided by a flow restriction imposed in the path of molten glass flow.

In that version of the invention shown in FIG. 7, a different type of bushing is proposed, consisting of an upper reservoir 11 containing a body of molten glass 12 of appreciable depth and joined by a restricted flow passage 13 to a lower bushing section 14 containing a body of molten glass 15 directly overlying an orificed plate 3 of the type previously described. A heating plate or screen 16 is closely spaced above the orifice plate 3 to ensure the presence of molten glass at the fiber forming temperature at the orifice plate. The restriction 13 is of a cross-sectional shape and size and of a vertical dimension sufficient to impose a pressure drop between the bodies of molten glass 12 and 15 of such magnitude that the pressure of the molten glass immediately above the orifice plate 3 is reduced to the values hereinbefore discussed, i.e., preferably of the order of atmospheric pressure and, in any event, less than the internal pressure of a bead or globule formed at any one of the orifices of the plate 3 upon breakout at that orifice, but greater than the internal pressure of the cones during steady state attenuation. The flow restriction 13 thus functions as, and serves as an alternative to, the previously described pressure plate 4 in preventing "bead-down" at any orifice of the plate 3 at which attenuation has been interrupted.

Figure 8:
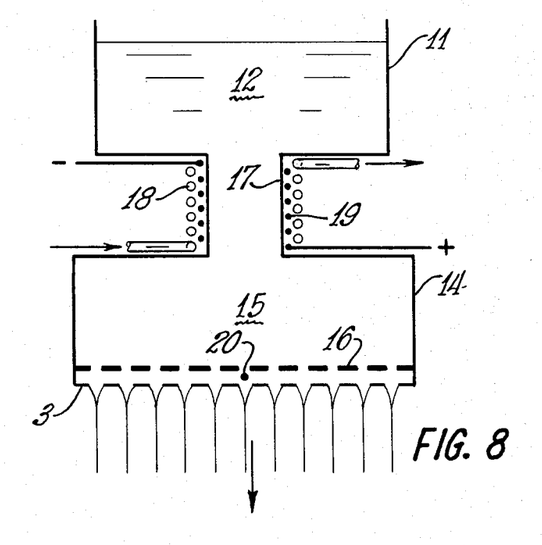
FIG. 8 is a schematic view of yet another version of the invention wherein the pressure drop is provided by a thermal valve.

FIG. 8 discloses yet another version of the invention which is similar in FIG. 7, but which employs a thermal valve. Once again, the bushing consists of upper and lower sections 11, 14, each containing a body of molten glass 12, 15, respectively, and the lower orifice plate 3 closely underlies a heater plate 16. The bodies 12 and 15 of molten glass are interconnected by a passage 17 which, in and of itself, need not form a critical pressure reducing function. The passage 17 is surrounded by a fluid-cooled helical heat exchanger 18 through which cooling air, water or other fluid is circulated to chill the molten glass flowing through the passage 17. A helical heating coil 19 having its ends connected to a suitable source of electricity, closely surrounds the passage 17 to heat the glass flowing through the passage 17 by conduction and radiation heat exchange through the walls of the passage. Located in the molten glass body 15, preferably between the heater plate 16 and the orifice plate 3 is a thermocouple controller 20 for maintaining the necessary glass temperature immediately above the orifice plate 3. The thermocouple 20 can control any or all of heat exchanger 18, the heating coil 19 or the heating plate 16.

By heating and cooling the passage 17, the viscosity of the molten glass flowing therethrough can be controlled so as to maintain a desired pressure within the molten glass body 15 overlying the plate 3. By cooling the passage, the flow of molten glass is inhibited to impose a greater pressure drop. Conversely, by heating the passage, less of a pressure drop is imposed. Preferably, the heater coil 19 and the chilling coil 18 are utilized to maintain a pressure within the body 15 and closely above the orifice plate 3 which is substantially atmospheric pressure, and in all instances, the pressure above the plate 3 (a) is less than the internal pressure of a bead or globule formed at an orifice of the plate 3 upon attenuation interruption, as hereinbefore explained, and (b) is greater than the pressure internally of the cone during steady state attenuation. The heater plate 16 is employed to ensure that the molten glass immediately above the plate 3 is at its desired fiber-forming temperature.

By utilizing the flow restriction 13 and the thermal valve of FIG. 8, a proper and desired pressure drop can be maintained within the overall body of molten glass to obtain all of the advantages of the pressure plate 4 as hereinbefore discussed. The heater plate 16 may or may not impose no substantial pressure drop in the body of molten glass 15; it serves primarily to ensure the presence of molten glass at the orifice plate 3 at the desired fiber-forming temperature.

THE TEMPERATURE RELATIONSHIPS

Various means for controlling the temperature within the bushing 1 and the relative heating values of the bushing components are illustrated in FIGS. 9-12 for various forms of non-tipped and tipped bushings.

In FIG. 9, the bushing 1 contains a body 2 of molten glass above the orifice plate 3, the body of glass being supplied from any suitable source, e.g., melted from marbles or derived from a direct melt furnace. The intermediate plate 4 and the orifice plate 3 are of the configuration, orifice size and orifice density described in connection with FIGS. 1-4 above.

The bushing orifice plate 3 and the intermediate plate 4 are each electrically energized from a source of direct current in parallel, as shown in FIG. 9. The degree of heating of the plates generally is in proportion to their respective thicknesses. Preferably in the embodiment of FIG. 9, the intermediate plate is of greater thickness than the orifice plate, so that the molten glass is heated to a greater extent by the intermediate plate than by the orifice plate.

The orifice plate 3 is cooled at its exterior surface by the air or other cooling gas directed against the undersurface of the plate from a blower nozzle 9. The output gas from the nozzle 9 preferably issues from multiple outlet openings and sweeps across substantially the entire extent of the lower surface of the orifice plate to cool the glass issuing from the orifices, as hereinafter explained in detail in connection with the preferred embodiment of the invention. The general conditions for the gas cooling of a non-tipped orifice plate is disclosed in detail in the Strickland U.S. Pat. No. 3,905,790 for the particular apparatus disclosed therein.

To start the bushing, the space 2 is filled with molten glass, the plates 3 and 4 are energized, and air is emitted from the nozzle 9 to contact the undersurface of the plate 3. During start-up, the glass beads down as shown in FIG. 2, and the volume of air is relatively high to cool the plate sufficiently to maintain the plate at the proper temperature for bead-down without flooding despite the mass of the beads and glass streams issuing from the orifices adjacent the plate and directly under the plate surface. The bushing is energized electrically to maintain substantially the entire body 2 of glass at essentially the conventional fiber forming temperature of the glass composition. This fiberizing temperature will vary with the composition of the molten glass. The fiber forming temperature of E-glass, for example, may range from 1093° C. to 1371° C., and preferably from 1150° C. to 1260° C. There may well be transient or variable temperature gradients within the body 2, but the molten glass directly and closely overlying the orifice of the orifice plate 3 is maintained at the desired fiber forming temperature of the specific glass composition. This temperature is maintained by the electrically heated plates 3 and 4.

The temperature at the undersurface of the orifice plate 3 is maintained by external cooling means, e.g., the flow of cooling gas from the nozzle 9, at a non-flooding temperature for the specific glass composition and alloy composition of the orifice plate. The precise temperature of the plate 3 is difficult to measure, but from actual thermocouple measurements, the undersurface of the plate 3 apparently is at a temperature on the order of from about 982° C. to about 1038° C. for E-glass compositions where the plate 3 is made of J alloy.

Once the bead down or start-up operation has been completed and steady state fiberization is initiated, the volume of air from the nozzle 9 is reduced because of the smaller mass of glass forming the forming cones and attenuated fibers at the undersurface of the plate 3. To avoid overcooling of the molten glass flowing to the individual orifices of the plate 3 because of the gas cooling of the undersurface of the plate 3 in the preferred embodiment of this invention, certain measures are taken. Specifically, (a) the plate 4 is heated electrically to a temperature in excess of the temperature of the plate 3; (b) the molten glass in the bushing is heated closely and directly over the orifice plate 3 to compensate for a heat loss above the orifice plate 3; and (c) the heated plates 3 and 4 have vertically aligned apertures or orifices so that the molten glass heated by the plate 4 flows directly downwardly through the orifice plate 3, the molten glass at the periphery of each orifice being cooler than the molten glass at the center of each orifice. The cooler peripheral glass aids in preventing flooding, while the hotter central glass promotes fiberizing. All of the glass issuing from each orifice is attenuated into a filament and—once initiated—the process continues as in normal attenuation.

In a specifically preferred embodiment utilizing an orifice plate of J alloy and E-glass composition, the molten glass above the orifice plate 3 was at a fiber forming temperature of about 1150° C. to about 1260° C., and the exterior undersurface of the orifice plate 3 was determined to be about 982° C. to about 1038° C. A temperature differential of from about 93° C. to 204° C. is maintained; preferably the differential will range from about 93° C. to about 149° C. For other glass compositions, the fiber forming temperature will vary and for other combinations of glass and alloy compositions, the non-flooding temperature will vary.

Since the temperature of the plate 3 is maintained at a non-flooding temperature, the plate temperature can be maintained at the desired differential by appropriately sizing the thickness of the plate 3 relative to the plate 4, controlling the heating current flow through the plates 3 and 4 connected in parallel, and varying the volume of air issuing from the nozzle 9 and blowing across the plate 3 and forming cones present at the lower surface of the plate. Specfic plate thicknesses, air flow volumes, glass temperatures and orifice plate temperatures are hereinafter disclosed for specifically disclosed structures and glass compositions.

In the event of fiber interruption at one or more orifices of the orifice plate 3, as shown in FIGS. 4 or 6, for example, the heat balance is not materially upset, and there is no necessity for varying either the heating of the plates 3, 4 or the flow of air from the nozzle 9. Any change in the volume of glass (as the cone changes shape to a globule or bead) at the specific orifice at which interruption occurs does not change the overall heat balance, since the other, still attenuated cones are not affected. The plate 3 is already at the non-wetting temperature appropriate for bead formation at the specific orifice. Consequently, the bead does not enlarge, and the bead may move into its individual orifice, all as described above in connection with FIG. 4.

In a version of the invention shown in FIG. 10 of the drawings, the orifice plate 3a is of the tipped varety, as explained in connection with FIG. 5 above. The FIG. 10 version of the invention operates substantially as does the FIG. 7 version of the invention.

The temperature relationships within the embodiment of FIG. 10 essentially are the same as within the embodiment of FIG. 9. It is only necessary that the undersurface of the plate 3a or, more accurately, the ends of the tips of the plate 3a, be maintained at a temperature at which fiberization is possible. Further, because of the tips of the plate 3a, there is less tendency for the molten glass to flood across the undersurface of the isolated tips, and the plate 3a may be run at non-flooding temperatures in excess of the non-flooding temperature of the plate 3. Thus, the temperature of the plate 3a is less critical than the temperature of the plate 3, simply because the plate 3a has less tendency to flood because of the presence of the tips.

In utilizing a tipped orifice plate, conventional heating and cooling means may be utilized in conjunction with the pressure drop imposing means of FIGS. 1 through 8 to obtain the dripless operation of the present invention, so long as the molten glass is at the appropriate fiber forming temperature above the orifice plate 3a.

In FIG. 11, a different forming apparatus is illustrated using conventional fin shield cooling. More specifically, in FIG. 11, the bushing 1, the orifice plate 3a and the intermediate plate 4a are of the same configuration as in FIG. 10. However, the air cooling nozzles 9 have been replaced with conventional fin shields 10 immediately underlying the orifice plate 3a and effective in normal fin shield operation to thermally cool the orifice plate tips and the fiber forming cones by radiation and conduction. The fin shield 10 is preferably cooled by means of heat exchange liquid introduced in elements 10a through conduits 10b, as is well known in the art. Other than the substitution of the fin shields 10 for the gas nozzles 9, the structure and operation of the embodiment of FIG. 11 is identical to the configuration and operation of the embodiment of FIG. 10.

INTEGRATION OR SEPARATION OF THE PRESSURE AND THERMAL PORTIONS

It will be understood that the prior discussion of the pressure effects and the temperature effects of the structure and process of the present invention has isolated these two variables so that they may be individually considered; yet the two variables in combination determine the structure and operation of a disclosed preferred embodiment of the present invention. In order to avoid interruption of fiberization in the entire bushing upon the failure of fiberization at a specific orifice, it is necessary that the pressure above the orifice plate 3 (a) be less than the internal pressure of a globule or bead forming upon attenuation interruption and (b) greater than the internal cone pressure during steady state fiber attenuation, as explained in connection with FIGS. 1–8 above. In order to maintain the proper thermal conditions for fiberization and to maintain the desired non-wetting temperatures at the orifice plate, particularly the tipless orifice plate of the present invention, it is necessary that the temperature relationships explained in connection with FIGS. 9 through 11 be maintained.

These two variables can be readily correlated by electrically connecting the intermediate plate 4 of FIG. 1 and the orifice plate 3 of FIG. 1 in parallel as illustrated in FIG. 9 of the drawings with the intermediate plate being located in proximity to the orifice plate and being of a character to provide the desired pressure drop across the intermediate plate 4 to maintain the desired pressure above the orifice plate 3 within the space 5. By providing the proper relative thicknesses of the plates 3 and 4, the relative heating effects of the plates upon the body of glass 2 can be maintained and the proper temperature conditions at the orifice plate 3 will be provided, with final ultimate control being exercised by the degree of cooling of the orifice plate by either air from the nozzle 9 or the fin shields 10. Thus, a very simple structure can be provided in which the two plates 3 and 4 or 3a and 4a will yield the proper operating conditions of both pressure and temperature in combination with the cooling means exterior of the bottom plate 3, 3a.

Figure 12:
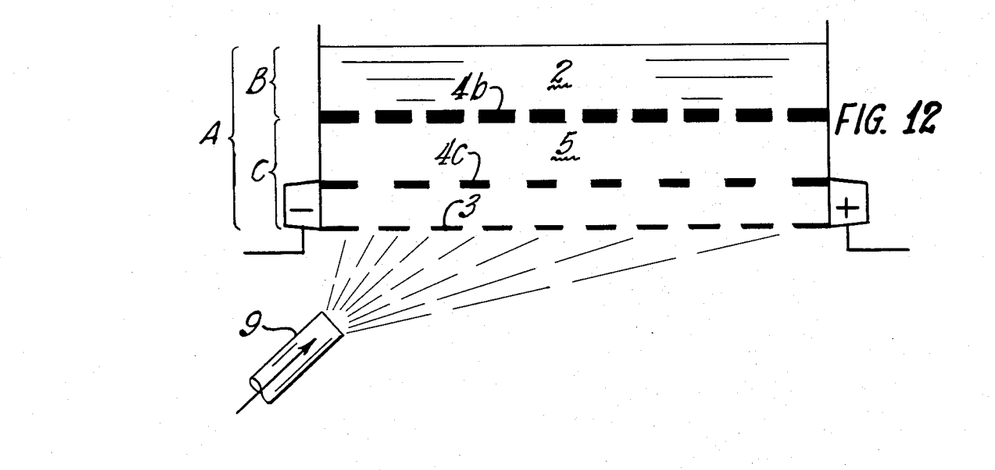
FIG. 12 is a schematic view similar to FIG. 1, but illustrating the separation of the pressure control and thermal control elements of the apparatus.

However, it is not necessary to provide such a simplified composite structure. The structure of FIG. 12 may be utilized in place of those structures illustrated in FIGS. 1 through 11. In FIG. 12, the functions of pressure control and temperature control are separated and isolated. In FIG. 12, the bushing 1 contains a pool 2 of molten glass within which a pressure control intermediate plate 4b is provided at a location spaced well above the plate 3 but within the confines of the pool. Preferably, the pressure plate 4b is of substantially the outside dimensions of the orifice plate 3 and is provided with apertures which are sized and numbered to provide the necessary pressure drop closely above the orifice plate. The plate 4b provides a pressure drop across the plate which is in accordance with the principles above explained, so that the pressure within the space 5 beneath the plate 4b and immediately above orifice plate 3 preferably is at substantially atmospheric pressure.

An intermediate heater element 4c is provided to closely overlie the plate 3, and the heater element 4c and the orifice plate 3 may be connected in parallel to a source of electrical energy for heating. The heater element 4c may be an apertured plate, heating screen, a series of heating rods, or any other appropriate mechanism for heating the glass to the fiberizing temperature. The heater element 4c may be of any desired configuration so long as the pressure condition above the orifice plate 3 is maintained.

The apparatus of FIG. 12 operates as does the apparatus of FIGS. 1 and 10 to maintain both the requisite pressure and temperature controls in the glass body above the plate 3 and to deliver glass to the plate 3 at the desired temperature.

DETAILED DESCRIPTION OF A PREFERRED EMBODIMENT

Figures 13, 14, 16, 18, 19, 20:
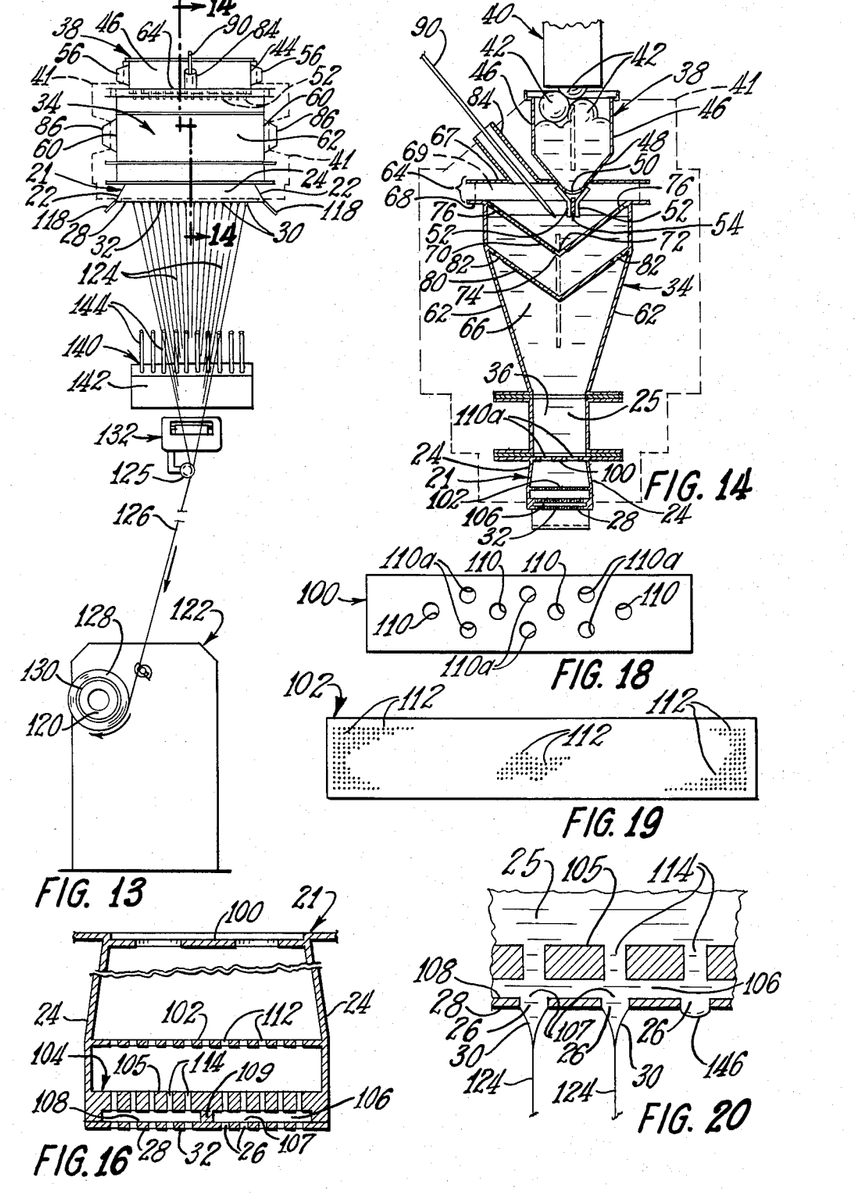
FIG. 13 is a front elevation view of apparatus according to the principles of the invention in a continuous glass filament forming operation.
FIG. 14 is an enlarged sectional side elevation view taken along the plane 14—14 in FIG. 13.
FIG. 16 is an enlarged sectional view taken along the plane 16—16 in FIG. 13.
FIG. 18 is a plan view of the upper orificed conditioning member in the feeder.
FIG. 19 is a plan view of the middle conditioning member in the feeder.
FIG. 20 is an enlarged sectional view of the bottom of the feeder where a bead has formed at an outlet where a filament has broken.
Figure 15:
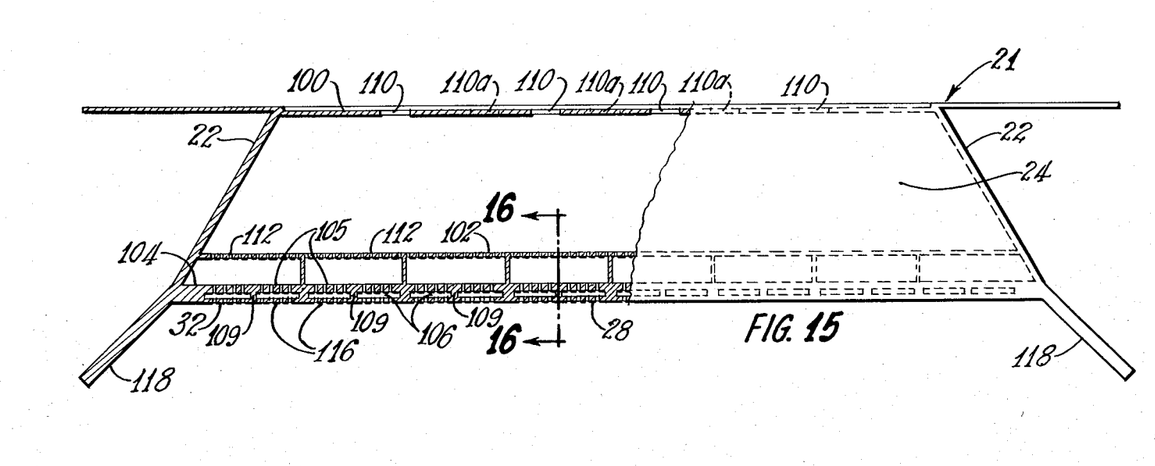
FIG. 15 is an enlarged front elevation view, partly in section, of the tipless feeder shown in FIGS. 13 and 14.

FIG. 13 shows a continuous glass filament forming process according to the principles of the invention, and the disclosed process equipment combines newly formed filaments into an untwisted bundle or strand and collects the strand as a wound package.

Referring to FIGS. 13 through 17, the process equipment includes a tipless container or feeder 21 of platinum or platinum alloy, such as J alloy, with generally opposed end walls 22 and opposed sidewalls 24. The feeder 21 holds a body of molten glass 25, normally an E-glass, that is emitted from closely spaced orifices 26 in a thin bottom wall 28 as streams 30. The bottom wall 28 has a planar or flat exterior bottom surface 32.

Any suitable means can be used to supply molten glass to the feeder 21. As shown in the Figures, the feeder 21 receives its supply of molten glass from a melter 38 through a glass conditioner 34 and a supply passageway 36.

Deposed above the melter 38 is a hopper 40 containing pieces of glass, such as marbles 42. During operation, the glass marbles 42 move downwardly by gravity into the melter 38 where they are reduced to a molten condition.

The container 34, melter 38, and the feeder 21 (except for its lower region) are surrounded in a conventional way by refractory material 41.

The melter 38 includes end walls 44 and sidewalls 46, each having a lower converging portion 48. The lower ends of the portions 48 define an outlet or throat 50 through which molten glass flows from the melter 38. At the outlet 50 are two lengthwise arranged groups of spaced-apart wires or members 52 welded to the sidewalls 46. Disposed between the groups of wires 52 is a vertically arranged plate 54. The lower edge of the plate 54 and the lower ends of the wires 52 preferably terminate slightly beneath the normal level of the glass in the conditioner 34. Molten glass from the melter 38 flows from the outlet 50 downwardly along the wires 52 and plate 54 in the form of a thin film or films onto the molten glass in the conditioner 34.

The end walls of the melter 38 have electrical terminals 56. Electrical current is supplied to the terminals 56 in a conventional manner to melt the glass marbles.

The conditioner 34 includes end walls 60, sidewalls 62, and a composite top 64 that define a chamber 66. The composite top 64 comprises an upper member 67 and a lower member 68; these members are separated by refractory 69. Disposed in the upper region of the chamber 66 is a first V-shaped screen 70 welded to the sidewalls 62 and end walls 60. The bight portion 72 of the screen 70 includes a group of spaced-apart glass flow openings 74. Arranged along each of the upper edge regions of the member 70 is a linear group of spaced-apart vent openings 76.

Spaced below the member 70 is a second V-shaped member 80 welded to the sidewalls 62 and end walls 60. Arranged along each of the upper edge regions of the member 80 is a linear group of spaced glass flow openings 82.

The top 64 incorporates a vent stack 84 for venting gases evolved from molten glass in the conditioner 34.

In operation, molten glass moves downwardly in the chamber 66 and through the openings 74 in the bight 72 of the screen 70. The molten glass then moves generally upwardly in the space between the screens 70 and 80 and then downwardly again through the openings 82 in the upper portions of the screen 80. Gases from the molten glass can escape to the atmosphere through the openings 76 in the upper regions of the first screen 70 and the vent stack 84. The glass continues to move downwardly through the supply passageway 36 to the feeder 21.

The end walls 60 incorporate electrical terminals 86. Electrical current is supplied to the terminals in a conventional manner.

A probe 90 extends downwardly through the vent tube 84 to the level of glass immediately beneath the melter 38. Conventional current control means (not shown) connects with the probe and varies current flow through the melter 38 according to the level of glass in the chamber 66. This matches the melting rate with the throughput rate of glass leaving the orifices 26 in the thin bottom wall 28 of the feeder 21. Control means of this character are disclosed in U.S. Pat. No. 3,013,095.

The feeder 21 can receive glass supply from other sources; for example, it can be used in a direct melt operation.

Molten glass moves downwardly during filament production to the bottom wall 28 of the feeder 20 through openings in three internal, spaced-apart and preferably parallel wall-like conditioning elements or members 100, 102, and 104, best shown in FIG. 16. These elements extend across the interior of the feeder 21 in a direction transverse to the downward glass movement during filament production. The upper member 100 is an orificed heater wall located at the entrance to the feeder 21; in operation, it tends to even out the temperature of the molten glass passing downwardly through it. The middle member 102 is an orificed heater wall or screen located between member 104 and the wall 100; it screens stones and seeds from the body of molten glass as the glass moves across it. It also helps level out the temperature of the glass. The lower orificed member 104 has a thinner orificed central portion 105 that is appreciably thicker than the members 100 and 102. Portion 105, which is in closely spaced-apart relationship overlaying the bottom wall 28, functions as a flow resistance to the molten glass, primarily because of its thickness. The wall 104 and particularly the portion 105 thereof serves as a pressure plate and is the equivalent of the plate 4 or 4a of FIGS. 1–12 above described. The lower orifice plate or bottom wall is the equivalent of the orifice plate 3 or 3a of FIGS. 1–12 as above described.

The space between the portion 105 of the member 104 and the bottom wall 28 is the equivalent of the space 5 of FIGS. 1–12 and forms a shallow well or molten glass readying space 106 located immediately above the entrances 107 of the orifices 26 at the interior surface 108 of the wall 28. The pressure and heating effects of portion 105, as discussed in connection with FIGS. 1–10 and as hereinafter further discussed, are important to the operation of the invention in the preferred embodiment shown in FIGS. 13–20 .

Spacer supports 109 connect each of the portions 105 with the corresponding section of bottom wall 28. The supports 109 resist downward sag or bowing of the thin bottom wall 28. Hence, they maintain the planar condition of the exterior surface 32.

FIG. 18 is a plan view of the rectangularly shaped upper apertured wall 100. There is a center row of four apertures or openings 110 along the longitudinal axis of the wall 100. Laterally on each side of this center row is a row of three offset apertures 110a. In the specifically disclosed embodiment of the invention, apertures of the center row are spaced apart on 3.8 cm centers; the apertures of the side rows, on 3.2 cm centers. All apertures are 0.64 cm in diameter. The thickness of the wall 100 is 0.05 cm.

FIG. 19 is a plan view of the rectangularly shaped screening wall 102. In the specific embodiment shown, there are 13 rows of 0.14 cm diameter openings or apertures 112 extending longitudinally of the wall 102. There are 22 apertures per cm$^2$. The thickness of the wall 102 is 0.05 cm.

In other embodiments of the invention, members like members 100 and 102 may not be required, particularly in a direct melt filament forming operation.

The wall portion 105 has orifices 114 in a pattern that preferably is the same as the pattern of the orifices 26 in the bottom wall 28. As shown, the wall portion 105 is 0.15 cm thick and has orifices that are 0.13 cm in diameter; their centers are in the preferred relationship, aligned with the centers of the orifices 26. The orifice density in the wall 105 is 15 orifices per cm$^2$; the orifice density in the bottom wall 28, 15 orifices per cm$^2$. The bottom wall is 0.025 cm thick and has orifices 26 that are 0.15 cm in diameter. The size, number and orifice density of the apertures in the portion 105 and the wall 28 may be varied as previously explained in connection with FIGS. 1–12. In the embodiment shown, the wall portion 105 is about six times as thick as the bottom wall 28, although this thickness relationship can be varied so long as the desired pressure drop across the portion 105 is maintained, as earlier explained.

Figure 17:
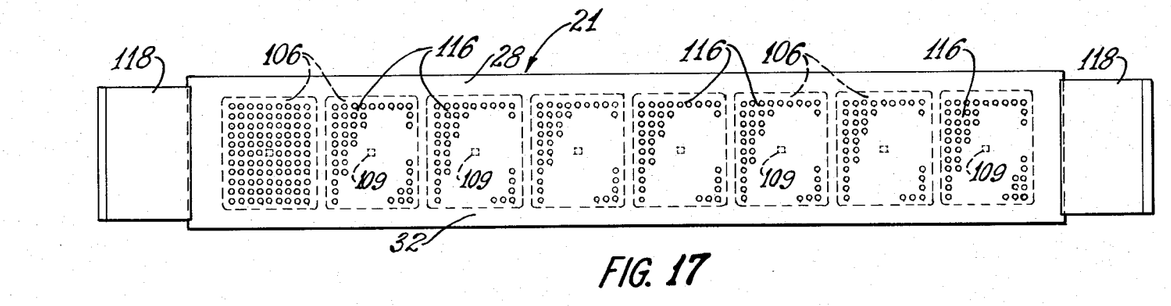
FIG. 17 is an upwardly directed view of the bottom of the feeder shown in FIGS. 13-16.

Referring to FIG. 17, it can be seen that there are eight orifice patches 116 on the bottom wall 28. Each patch 116 has 98 orifices opening onto the exterior surface 32 of the wall 28.

The entire feeder 21, including all of its internal members, is electrically resistance heated as known in the art by current supplied from a source (not shown) through terminals 118 on the ends 22 of the feeder 21. The terminals 118 extend from the lower region of the end walls 22 in a direction outwardly and downwardly. In a sense, the location of the terminals 118 makes them an extension of the bottom wall 28. Other terminal arrangements can be used. The terminals 118 are the equivalent of the terminals of FIGS. 7–10, serving to energize the portion 105 and the wall 28 in parallel.

The rotatably driven collet 120 of a winder 122 located below the feeder or bushing 21 attenuates the streams 30 into continuous glass filaments 124.

A gathering shoe 125 located between the winder 122 and feeder 21 combines the filaments 124 into a strand 126. The winder 122 collects the strand 126 as a wound package 128 on a collection tube 130 telescoped on the collet 120.

An applicator 132, as known in the art, is positioned above the gathering shoe 125 and applies a protective sizing or coating material to the filaments 124 before they are combined into the strand 126.

Other conventional filament attenuation means, gathering devices, and sizing applications can be used.

The process in FIG. 13 includes means for removing heat from the filament forming environment at the bottom wall 28. As illustrated in the Figures, there is provided cooling means in the form of a fluid flow nozzle 140. This nozzle directs a flow of cooling fluid or gas, such as air, upwardly toward the bottom 28 of the bushing 21 to cool the filament forming region. The flow of cooling air removes heat from the filament forming region, and helps keep the region in condition for filament forming. The nozzle 140 is the equivalent of the nozzle 9 shown in FIGS. 7, 8 and 10 and previously described. Other cooling means can be used, for example, fin shields.

The nozzle 140 includes a hollow housing 142 and a row of tube outlets 144 on the top of the housing 142. The tubes 144 communicate with the interior of the housing 142. Air supplied under pressure to the nozzle 80 discharges from the tube outlets 144 upwardly. Each of the tubes 144 extends 15 cm from the housing 142 and is 0.95 cm in diameter. Each of the tubes can be equipped with a valve to make individual tube discharge modifications.

The nozzle 140 is positioned so that the tubes 144 are inclined upwardly 83 degrees from the horizontal and aimed at the longitudinal midregion of the bottom wall 28. The ends of the tubes are about 20 cm from the exterior surface 32. In the operation of the specific design of apparatus of this invention shown in FIGS. 13 through 20, (a) the nozzle is supplied air at about 3.4 kPa; (b) during start-up, the nozzle 140 is set to discharge air at the rate of about 113 cubic meters per hour for bead formation; and (c) during steady state filament attenuation, it is set to discharge air at a reduced rate of about 42 cubic meters per hour.

At start-up, the pressure of the glass head in the bushing 21 is felt at the bottom wall 18 and exerts enough downward pressure to extrude molten glass through the orifices 26 of the wall 28. In practice, there is normally from 20 to 30 cm of glass above the wall 28, and conditions are present according to the invention that cause molten glass to be emitted in filament forming temperature condition and to form into individual separated globs or beads at the orifices 26, not a single flooded body of glass across the orifice patches. The formation of individual separated globs occurs across the entire orificed region of the bottom wall 28. The globs grow until their masses causes them to fall individually downwardly away from the bushing 21 with filament-like tails trailing behind. This individual glob formation greatly facilitates start-up, and the specific glob formation and the conditions under which it occurs are described in detail in connection with FIG. 2 where the formation of the globules or beads 6 is illustrated.

Bead "drops" during filament production interrupt the filament forming process and accordingly are not desirable during filament production. Drops are avoided during filament production in bushing 21 by the pressure change effected in the molten glass as the glass moves downwardly across a flow resistance region, which in the illustrated preferred embodiment takes the form of the heated orificed portion 105. As above explained more fully (see the description of FIGS. 3 and 4), during filament production a preferred substantially atmospheric pressure is established in the molten glass at the orifice plate 28, so that upon a filament break at one of the orifices 26, flow of molten glass from such orifice 26 stops.

Returning now to a discussion of start-up, individual beads are formed at the orifices 26 by conditions effective (a) to permit molten glass supplied to the orifices 26 to emerge therefrom in filament forming temperature condition, and (b) to keep the exterior surface 32 sufficiently lower in temperature than the filament forming temperature of the emitted glass that the surface 32 is in non-flooding temperature condition in relation to the emitted glass. Experience shows that most commercial E-glasses have a filament forming temperature in a range of from 1093° C. to 1371° C; many have a filament forming temperature from 1150° C. to 1260° C. Experience shows that the non-flooding temperature condition for J alloy and E-glass tends to be generally from around 980° C. to 1030° C.

In a process using a metal or metal alloy stream forming member, such as the orificed bottom wall 28, the thinness of the wall is important to provide for both the discharge of molten glass in filament forming condition and the establishment of the lower non-flooding temperature of its exterior surface 32. The molten glass passes through the very short orifice passageways of a thin orifice plate so quickly that little energy is removed from the glass. Consequently, the bulk of the molten glass emitted from orifices 26 may well be in filament forming temperature condition. Only a small exterior region of the molten glass in contact with the exterior surface 32 at the region defining the outlet of the orifices 26 is believed to be at the lower non-flooding temperature condition of the surface 32.

The thinness of a bottom wall may not be so important where the wall is made of material having a thermal conductivity different from platinum alloy, for example, a high temperature ceramic material.

Practice has shown that, in the version of the invention shown in FIGS. 13–20, the wall 28 is preferably thinner than about 0.038 cm when J alloy is used with E-glass. A bushing with a bottom wall having a thinness of 0.025 cm has been successfully operated. A preferred range of thinness is from about 0.025 cm to about 0.031 cm; walls having a thickness greater than 0.038 cm may draw too much electrical energy and thereby become too hot. However, as explained in connection with FIGS. 9–11, the relative thickness of the plates 4a and 3a governs the relative heating of the orifice plate, and the thickness of the orifice plate can be varied considerably from these defined values specific to the disclosed version of the apparatus.

In the embodiment of FIGS. 13 through 20, the electrically energized orificed member 105 plays an important role in heating the bottom wall 28 and in supplying energy to the molten glass in the bushing 21 to establish glass and wall conditions according to the invention. Although the thin bottom wall 28 and the member 105 form parallel resistance members in an electric circuit, calculations shown that the orificed sections 116 of the bottom wall 28 experience little resistance heating compared to the wall portion 105; this is due primarily to the high resistance from its thinness. As a result, the heat source for the orificed sections 116 is primarily from the portion 105 through the glass 25 in the form of conduction.

The distance between the wall 28 and wall 105 forming the well or readying space 106 is important for energy transfer purposes. Since the molten glass receives energy from the heated member 105 and gives energy to the orifice sections 116 of the wall 28, the distance between the member and the wall must be effective to permit an energy level in the molten glass that promotes a temperature state in the wall 28 effective to bring the exterior surface 32 into non-flooding temperature condition with respect to the delivered streams 30. Yet the molten glass must be in filament forming condition when emitted from the orifices 26. The energy transfer must take into account energy dissipation caused by the exterior cooling of the orifice plate, i.e., caused by the cooling air from the nozzle 140.

The distance between wall 28 and wall 105 preferably is generally 0.08 cm in the embodiment shown in the Figures; the distance will vary according to the glass composition, bushing material, bushing temperature, and the relative thicknesses of the member 105 and the bottom wall 28.

In the practice of the preferred embodiment, the temperature of the glass just above the member 104 is kept around 1280° C. Hence, in operation of the embodiment shown there is usually a temperature drop of from about 111° C. to about 222° C., preferably from about 111° C. to about 167° C., between the glass just above the member 104 and the exterior surface 32. This is measured by a thermocouple positioned about 0.9 cm above the member 104 and located midway along one of the sidewalls 24. This temperature of 1280° C. is used as a set point for operating the bushing 21.

The invention embraces embodiments where a stream forming member, such as the orificed bottom wall 28, is not electrically energized. Here the bottom wall 28 is electrically isolated from the remainder of the bushing; electrical terminals direct electrical energy to the bushing above the wall 28.

In summary, according to the invention there are established by a stream forming member, like the orificed bottom wall 28, conditions effective to permit molten glass supplied to the orifices to be emitted therefrom in filament forming condition, and to keep its exterior surface in lower non-flooding temperature condition in relation to molten glass emitted from the orifices. At start-up, individual separated beads of molten glass are formed across the orificed patches 116.

In one form of the invention, conditions according to the invention are promoted by adding heat to the molten glass from a source within the glass in the region immediately adjacent entry of the glass into the orifices of the stream forming member. Heat can be conveniently added within the body of molten glass by an electrically heated member such as the member 105. In other forms of the invention, molten glass can be supplied to a feeder exit region at a temperature condition sufficient for fiber attenuation without the addition of heat energy at the bushing exit region.

An operator can modify the air supply from the nozzle 140 to modify energy dissipation at the surface 32 to tune bead forming conditions. Normally, a greater flow of air from the nozzle 140 is required during start-up than during steady state operation, as earlier explained.

During filament formation, the pressure aspect of the invention supplies molten glass to the orifices 26 at such a pressure that upon filament break at an orifice, flow of molten glass therefrom stops. This can be accomplished in certain embodiments by using a flow resistance region or layer within the feeder, as fully explained in connection with FIGS. 1–8. As shown, the flow resistant region is in the form of the heated orificed member 105 positioned in closely spaced relationship over the bottom wall 28.

During filament formation, molten glass moves downwardly through the orifices 114 in the thick member or pressure plate 105. A pressure drop occurs such that the pressure of the molten glass at the outlets of the orifices 26 is insufficient to form a bead large enough to fall under the influence of gravity. Generally in the illustrated preferred embodiment, this molten glass pressure is "substantially atmospheric pressure", as explained in connection with FIGS. 1 through 8. The flow resistance of the member 105 is effective to impart to the molten glass at the orifice outlets a pressure less than the internal pressure of a static bead of molten glass formed upon cessation of filament attenuation at an orifice. Flow from the orifice stops.

FIG. 20 shows a convex shaped bead or globule 146 formed because of breakout during steady state filament attenuation using the feeder 21. Under these conditions, flow from the bead's orifice has stopped; filament formation is continuing at neighboring outlets. Calculations show that in most instances the pressure in the molten glass at orifice outlets must be in the vicinity of 7900 dynes/cm$^2$, or around 3.2 cm of glass for 0.1524 cm diameter orifices; accordingly, under most conditions the back pressure from the effective surface tension of a bead formed from orifices of this size must be at least 7900 dynes/cm$^2$.

The location of the member 105 as shown in the preferred embodiment was determined from considerations of energy transfer, not from considerations of pressure. Member 105 performs two functions, i.e., energy transfer and pressure modification. But the invention embraces forms of the invention where these two functions are accomplished by separate means. From a pressure point of view, the flow resistance can be located anywhere upstream of the bottom wall. The only requirement is that the pressure in the glass at the orifice outlets be such that molten glass will stop flow upon a filament break, as explained in connection with FIGS. 1–12.

Flow resistance can be provided by other means, such as a closely packed layer of high temperature resistant discrete material such as J alloy beads held in spaced relation above the bottom of the bushing. Other suitable forms of flow resistance have been disclosed in FIGS. 1 through 12. For purposes of the "dripless" operation of the invention, the flow resistance means need not be electrically energized.

The "dripless" aspect of the invention embraces embodiments where the stream forming member, such as the bottom wall of a bushing, has conventional orificed projections of tips and conventional bushing heating means are employed.

In operation, apparatus like that shown in the Figures as successfully run without flooding where up to 20 percent of the filaments were broken. The number of filaments that can be broken before dripping or flooding occurs can be more than 20 percent and depends upon the location of filament breaks. A cluster of filament breaks tends to result in earlier glass dripping—and consequently, earlier process interruptions. More breaks can occur without glass dripping, if the breaks are scattered throughout an orifice patch.

INDUSTRIAL APPLICABILITY

The invention disclosed herein is readily applicable to the formation of continuous or staple glass filaments.

We claim:

1. The method of forming continuous glass filaments comprising:
   (1) delivering forming cones of molten glass from spaced-apart orifices in a wall retaining a body of molten glass;
   (2) attenuating a continuous glass filament from each of the cones; and
   (3) reducing the pressure of the molten glass at the orifices to a pressure less than the internal pressure of a bead formed at an orifice upon the cessation of filament attenuation at that orifice, but greater than the internal pressure of the forming cones during attenuation.

2. The method of claim 1 wherein the step (3) is carried out by delivering the molten glass through a flow resistance located closely above the orificed wall.

3. In a method of attenuating glass fibers from a body of molten glass overlying an orifice plate having a plurality of orifices therein from which the molten glass is attenuated as fibers from forming cones, the improvement comprising the step of reducing the pressure of the body of glass immediately over the orifice plate to a pressure which (a) is less than the internal pressure of a bead formed upon attenuation interruption at an orifice of said plate and (b) is greater than the pressure internally of the cone at said orifice during steady state attenuation.

4. The method of claim 3 wherein glass fibers are continuously attenuated as filaments.

5. The method of claim 3 wherein glass fibers are discontinuously attenuated as filaments.

6. The method of continuously attenuating glass fibers in a steady state operation from a body of molten glass overlying an orifice plate having a plurality of vertical orifices therein, comprising the steps of (1) reducing the pressure of the body of glass immediately over the orifice plate to a pressure less than the internal pressure of a bead formed upon attenuation interruption at an orifice of said plate, (2) forming a forming cone at each orifice, and (3) attenuation a fiber from each cone, the pressure of step (1) being greater than the internal pressure of the cones during steady state attenuation.

7. The method as defined in claim 6, wherein the orifice plate is tipless and has a lower surface at which the forming cones are formed.

8. The method as defined in claim 6 wherein the orifice plate is provided with tips defining the individual orifices at which the forming cones are formed.

9. The method as defined in claim 6, wherein the pressure reducing step is carried out by flowing glass from the body of molten glass through an apertured plate located within the body and spaced vertically above the orifice plate.

10. A method of making glass fibers, comprising the steps of:
   (1) providing a body of molten glass of appreciable depth over an orifice plate having a plurality of vertical orifices therethrough;
   (2) flowing molten glass from said body through each orifice to form an individual bead at the outlet of each orifice, the molten glass pressure above the orifice plate being greater than the internal pressure of the beads;
   (3) attenuating the beads to form a fiber cone at each orifice and a fiber drawn from each cone;
   (4) during the performance of step (3), reducing the pressure on the molten glass immediately above the plate to a pressure less than the internal pressure of a bead formed at an orifice upon interruption of fiber attenuation at that orifice but greater than the internal pressure of the cones during attenuation;
   (5) cooling the undersurface of the orifice plate to temperature (a) which is less than the temperature of the glass above the orifice plate and (b) which is less than the temperature at which the molten glass will flood across the orifice plate; and
   (6) in the event of fiber forming interruption at any given orifice, converting the cone at said given orifice into a globule at the outlet of the orifice because of the glass surface tension which causes a positive pressure interiorly of the globule to prevent the flow of glass through the orifice from the glass overlying the orifice plate at the reduced pressure of step (4).

11. A method as defined in claim 10, wherein the horizontal orifice plate is planar and tipless.

12. A method as defined in claim 10, wherein step (4) is carried out by flowing molten glass from said body through a perforate pressure plate immersed in said body and located above the orifice plate and imposing a pressure drop in the flow to the orifice plate sufficient to reduce the pressure in the body above the orifice plate to substantially atmospheric pressure.

13. A method as defined in claim 12, wherein the orifice plate is planar and tipless and the step (5) is carried out by electrically heating both the pressure plate and the orifice plate and flowing a coolant gas across the undersurface of said orifice plate.

14. A method of making glass fibers, comprising the steps of:
   (1) flowing molten glass at a first flow rate through an orifice to form an individual bead at the outlet of the orifice;
   (2) attenuating the bead to form a forming cone and a filament;
   (3) increasing the flow rate to a second flow rate through the orifice while simultaneously reducing the pressure of the molten glass to a pressure (a) less than the internal pressure of a bead formed at the orifice upon interruption of attenuation at that orifice and (b) greater than the internal pressure of said cone during the performance of step (2); and
   (4) in the event of fiber forming interruption at the orifice, utilizing the internal pressure of the resultant bead to prevent the flow of molten glass through the orifice.

15. In a method of making glass fibers, the steps of:
   (1) forming a pool of molten glass in a bushing over an orifice plate having a plurality of orifices therein and an intermediate perforate plate immersed in said pool and overlying said orifice plate;
   (2) initially flowing molten glass through the intermediate plate and said orifice plate at a pressure sufficient to extrude a globular bead at each orifice;
   (3) attenuating said globular beads to provide a forming cone at each orifice of said orifice plate and to draw a fiber from each such cone, while maintaining the orifice plate at a temperature at which the cones will not flood across the lower surface of the orifice plate;
   (4) drawing fibers in a steady state operation with appreciable downward flow of molten glass through said intermediate plate reducing the pressure of the molten glass above the orifice plate to a pressure less than the internal pressure of a bead formed at an orifice upon interruption of fiber drawing at that orifice; and
   (5) in the event of breakage of an individual fiber; (a) a globular bead is formed at the corresponding orifice because of the molten glass surface tension, (b) the surface tension generates a positive pressure internally of said globular bead which is greater than the pressure above the orifice plate, and (c) the greater internal pressure of said globular bead prevents the flow of glass into the bead from the glass above the orifice plate and prevents bead drop and orifice plate flooding due to bead growth.

16. The method of claim 15, wherein the orifice plate is planar and non-tipped.

17. The method of preventing bead drop during the attenuation of glass filaments comprising:
   (a) delivering molten glass to the upper surface of an orifice plate having orifices and issuing streams of molten glass downwardly through said orifices;
   (b) attenuating glass filaments from the streams; and
   (c) during the performance of step (a) reducing the pressure of the molten glass during attenuation to an extent such that, upon a filament break at one of the orifices, the flow of molten glass from said orifice stops, yet the pressure is sufficient for fiber attenuation at the other orifices.

18. The method of preventing bead drop during the attenuation of glass filaments comprising:
   (a) flowing molten glass from a body of such glass downwardly through a plurality of individual orifices, the molten glass issuing from each orifice as a continuous stream;
   (b) attenuating each stream into a glass filament; and
   (c) during the performance of step (a), flowing the molten glass downwardly through a perforate pressure plate located in the body of glass above the orifices, the flow of molten glass through said plate being sufficient to feed glass during attenuation, but reducing the pressure of the molten glass beneath the plate to an extent such that, upon a filament break at one of the orifices, the flow of molten glass from said one orifice ceases.

19. The method of preventing bead drop during the attenuation of glass filaments, comprising:
   (a) flowing molten glass through a flow resistance to and through a plurality of orifices in an orifice plate;
   (b) attenuating a glass fiber at each orifice; and (c) the pressure of molten glass between said flow resistance and said orifice plate being sufficient for fiber attenuation during the performance of steps (a) and (b) but being insufficient to flow glass through a given one of said orifices should attenuation be interrupted at said given orifice.

20. In a method of making glass fibers wherein molten glass is supplied to the orifices of an orifice plate, and a glass fiber is attenuated at each orifice, the improvement of preventing bead drop during fiber attenuation by supplying molten glass to said orifices at a pressure which is sufficient to feed glass during attenuation, but which is less than the internal pressure of a bead formed at any one orifice upon interruption of attenuation at said one orifice.

21. The method of making glass filaments comprising:
(a) flowing molten glass downwardly through a pressure resistance and then through a plurality of orifices to issue molten glass from the orifices as individual streams;
(b) attenuating each of said streams into a filament; and
(c) the pressure of the molten glass at each individual orifice being sufficient to fed glass during attenuation, but insufficient to flow molten glass through that orifice in the absence of attenuation.

22. In a method of making glass fibers wherein molten glass is supplied to the orifices of an orifice plate, the improvment of preventing bead drop during fiber attenuation by attenuating fibers from forming cones at the individual orifices while the molten glass at each orifice is at a pressure greater than the internal pressure of the respective cones and at a pressure less than the internal pressure of a bead formed at any orifice at which attenuation has been interrupted.

* * * * *